April 30, 1940.  E. O. TAYLOR  2,199,274
BUMPER ALARM SWITCH
Filed Jan. 6, 1938
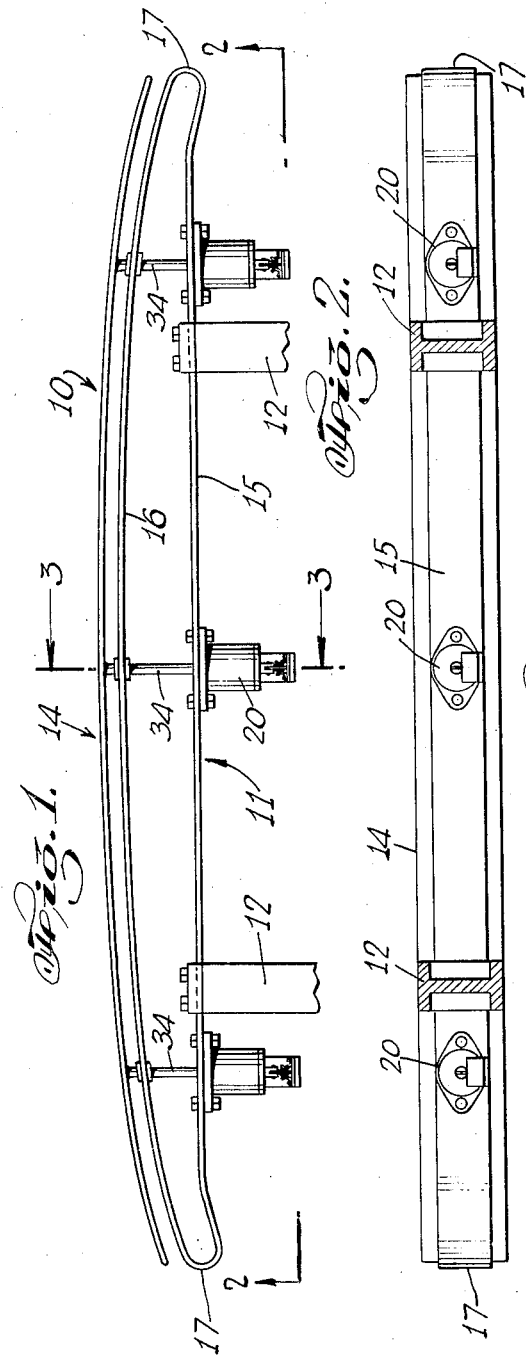
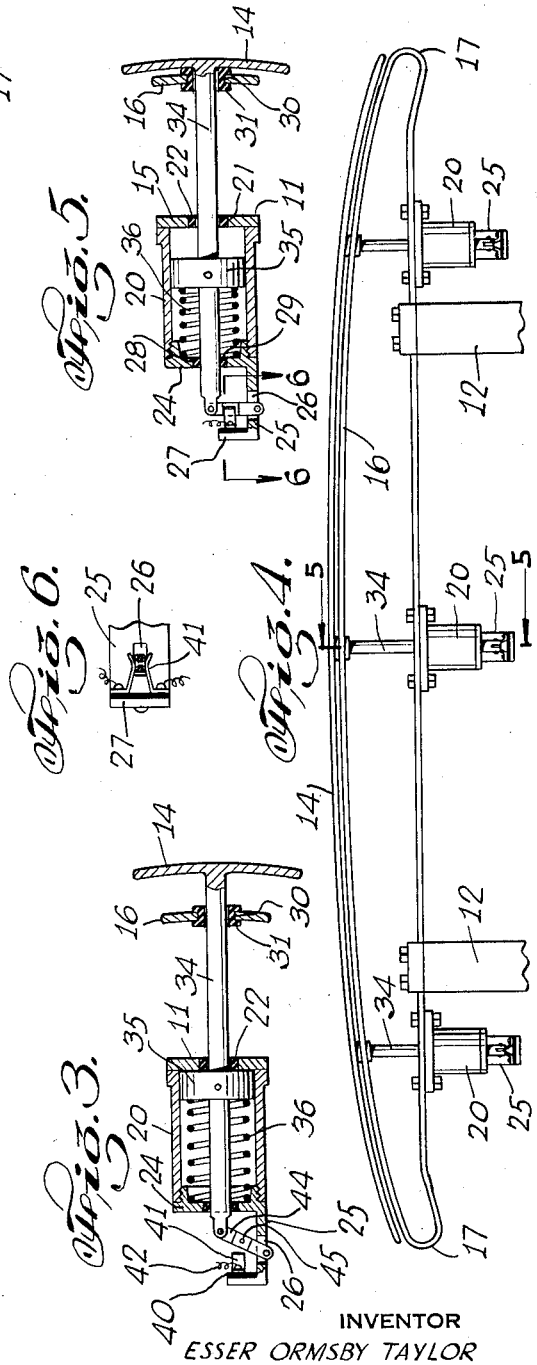
INVENTOR
ESSER ORMSBY TAYLOR
BY Carl Miller
ATTORNEY

Patented Apr. 30, 1940

2,199,274

UNITED STATES PATENT OFFICE 2,199,274

BUMPER ALARM SWITCH

Esser Ormsby Taylor, Mount Vernon, N. Y.

Application January 6, 1938, Serial No. 183,636

1 Claim. (Cl. 200—52)

This invention relates to alarm bumpers for automobiles. It is particularly directed to automobile construction in which an electric alarm is actuated when the bumper of the automobile is struck, for example, when one automobile attempts to push a parked automobile provided with my improved bumper alarm.

An object of this invention is to provide a bumper actuated electric alarm to protect parked automobiles during the absence of the driver, from operators who might push the parked automobile and cause damage thereto, the construction being such that rattling is prevented.

A further object of this invention is to provide a strong and durable bumper actuated alarm of the character described, which shall be relatively inexpensive to manufacture and install, which shall be smooth and positive in action, which may be incorporated into automobiles now in use, and which shall yet be practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claim.

In the accompanying drawing, in which is shown one of the various possible illustrative embodiments of this invention, Fig. 1 is a top plan view of a bumper adapted to actuate an alarm on an automobile, and embodying the invention;

Fig. 2 is a cross-sectional view taken on line 2—2 of Fig. 1;

Fig. 3 is an enlarged, cross-sectional view taken on line 3—3 of Fig. 1;

Fig. 4 is a top plan view similar to Fig. 1, but showing the bumper in signal making or actuating position;

Fig. 5 is a cross-sectional view taken on line 5—5 of Fig. 4; and

Fig. 6 is a cross-sectional view taken on line 6—6 of Fig. 5.

Referring now in detail to the drawing, 10 designates bumper structure embodying the invention and adapted to close a switch for completing a circuit for a suitable electric alarm on the automobile, for example, the usual horn.

The bumper comprises a section 11 fixed to the rear ends 12 of the automobile frame, and a second bumper section 14 slidably mounted on section 11, in the manner hereinafter described.

Section 11 comprises a back portion 15 engaging said ends of the automobile frame, and a front longitudinally curved portion 16 connected to said back portion by bent end portions 17.

Fixed to the rear of portion 15 of section 11, at the center and on opposite sides of frame ends 12, are horizontal cylinders 20. Said portion 15 closes the front ends of said cylinders and is formed with openings 21 at the axes of said cylinders, in each of which is fitted a rubber bushing 22. The rear ends of said cylinders are closed by members 24 screwed to said rear ends, each having a rearwardly extending bracket arm 25 formed with a longitudinal slot 26, and provided with an upstanding lug 27.

Each member 24 has an opening 28 aligned with opening 21 and receiving a rubber bushing 29.

Bumper section 14 is formed with openings 30 aligned with said openings 21 and 28, and receiving rubber bushings 31. Fixed to said bumper section are horizontal, parallel, rearwardly extending rods 34 passing through bushings 31, 22 and 29. The rods 34 thus pass through cylinders 20. On said rods are pistons 35 disposed in cylinders 20. Interposed between each piston and member 24 is a coil compression spring 36 surrounding rod 35. Springs 36 are adapted to push bumper section 14 forwardly to the position shown in Figs. 1 and 3 of the drawing.

Attached to the inner face of each arm 27 is an insulating block 40 to which is attached a pair of normally spaced spring switch members 41 connected by wiring 42 to any suitable electric alarm, for example, the usual horn of the automobile.

Pivoted in each slot 26, to bracket 25, is a knife blade switch member 44 pivotally connected at its upper end to the rear end of one of rods 34. Blade 44 is of insulating material but has a central metallic bottom 45.

Normally, blade 44 is out of contact with respect to switch members 41, as shown in Fig. 3. When bumper section 14 is struck however, by another automobile, blade 44 will be moved to bring button 45 between spring switch members 41, as shown in Figs. 5 and 6 to complete the circuit for the alarm, and warn the operator to stop pushing.

The bumper shown in the drawing may be either the front or rear bumper of the automobile.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

In combination with au automobile having a frame, a bumper section having a rear portion fixed to said frame, and a front portion attached at the ends thereof to said rear portion, said front and rear portions having aligned openings, a horizontal cylinder on said rear portion, said rear portion closing one end of said cylinder, an end wall for the other end of said cylinder, formed with an opening aligned with said first mentioned openings, a second bumper section, a rod on said second section passing through all of said openings, and through said cylinder, a piston on said rod and in said cylinder, a spring interposed between said piston and said end wall, a switch member supported by said cylinder, a switch blade pivoted to the end of said rod and on said cylinder cooperating with said switch member, and rubber bushings in said openings to prevent rattling of said rod.

ESSER ORMSBY TAYLOR.